US012572293B2

(12) United States Patent
Gupta et al.

(10) Patent No.: US 12,572,293 B2
(45) Date of Patent: Mar. 10, 2026

(54) SPEEDING CACHE SCANS WITH A BYTEMAP OF ACTIVE TRACKS WITH ENCODED BITS

(71) Applicant: INTERNATIONAL BUSINESS MACHINES CORPORATION, Armonk, NY (US)

(72) Inventors: Lokesh Mohan Gupta, Tucson, AZ (US); Matthew J. Kalos, Tucson, AZ (US); Matthew G. Borlick, Tucson, AZ (US); Beth Ann Peterson, Tucson, AZ (US); Kevin J. Ash, Tucson, AZ (US); Kyler A. Anderson, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 18/065,054

(22) Filed: Dec. 13, 2022

(65) Prior Publication Data

US 2024/0192871 A1      Jun. 13, 2024

(51) Int. Cl.
*G06F 3/06*            (2006.01)
(52) U.S. Cl.
CPC ............ *G06F 3/064* (2013.01); *G06F 3/0604* (2013.01); *G06F 3/0659* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 6,343,159 B1 * | 1/2002 | Cuciurean-Zapan | ..... | G06T 5/73 345/596 |
| 7,170,989 B1 * | 1/2007 | Aubuchon | .............. | H04M 3/22 379/207.02 |
| 7,475,321 B2 * | 1/2009 | Gurumurthi | ........ | G06F 11/0724 711/155 |
| 8,285,709 B2 | 10/2012 | Candea et al. | | |
| 8,370,850 B2 * | 2/2013 | Nochimowski | ....... | G06F 3/0679 711/123 |
| 8,898,114 B1 * | 11/2014 | Feathergill | .......... | G06F 11/1453 707/648 |
| 9,892,803 B2 * | 2/2018 | Reed | ................... | G06F 12/0811 |

(Continued)

OTHER PUBLICATIONS

Anonymous, "Method and System for Performing Intelligent Write Caching For Tracks Only Once In Storage Systems", IPCOM000212666D, Nov. 22, 2011, 3p.

(Continued)

*Primary Examiner* — Christopher D Birkhimer
(74) *Attorney, Agent, or Firm* — Cantor Colburn LLP; Stephen Yoder

(57) ABSTRACT

A computer-implemented method for managing tracks in a cache is provided. The computer-implemented method includes instantiating cache control blocks to each manage operations for one of the tracks and instantiating a bitmap corresponding to each of the cache control blocks. Each bitmap includes an active bit indicating whether the one of the tracks for which the corresponding cache control block manages operations is active and additional bits indicating additional characteristics of the one of the tracks for which the corresponding cache control block manages operations.

20 Claims, 12 Drawing Sheets

(56) References Cited

U.S. PATENT DOCUMENTS

| 10,649,785 | B2 | | 5/2020 | Gschwind et al. | |
|---|---|---|---|---|---|
| 11,178,250 | B2 | | 11/2021 | Shribman et al. | |
| 11,550,726 | B1 | * | 1/2023 | Gupta | G06F 12/0891 |
| 2001/0047454 | A1 | * | 11/2001 | Soderstrom | G06F 3/0632 |
| | | | | | 711/118 |
| 2004/0039880 | A1 | * | 2/2004 | Pentkovski | G06F 12/0811 |
| | | | | | 711/146 |
| 2006/0143406 | A1 | * | 6/2006 | Chrysos | G06F 12/0811 |
| | | | | | 711/143 |
| 2006/0156155 | A1 | * | 7/2006 | Gurumurthi | G06F 11/0793 |
| | | | | | 714/746 |
| 2009/0262397 | A1 | * | 10/2009 | Horn | G06F 3/1285 |
| | | | | | 358/1.18 |
| 2010/0070711 | A1 | * | 3/2010 | Arimilli | G06F 12/0831 |
| | | | | | 711/146 |
| 2010/0281216 | A1 | * | 11/2010 | Patel | G06F 12/121 |
| | | | | | 711/E12.017 |
| 2014/0099036 | A1 | * | 4/2014 | Smith | G06V 30/2253 |
| | | | | | 382/218 |
| 2014/0156909 | A1 | * | 6/2014 | Farhan | G06F 12/0871 |
| | | | | | 711/103 |
| 2014/0185687 | A1 | * | 7/2014 | Endresen | H04N 19/60 |
| | | | | | 375/240.18 |
| 2014/0237147 | A1 | * | 8/2014 | Joshi | G06F 3/0664 |
| | | | | | 710/74 |
| 2014/0253975 | A1 | * | 9/2014 | Robinson | H04N 1/4053 |
| | | | | | 358/2.1 |
| 2014/0279848 | A1 | * | 9/2014 | Schmidt | H04N 21/234309 |
| | | | | | 707/609 |

OTHER PUBLICATIONS

Anonymous, "Method to provide read committed isolation for multi version concurrency control column store database", IPCOM000261079D, Jan. 27, 2020, 11p.

Estan, "Bitmap Algorithms for Counting Active Flows on High-Speed Links", IEEE/ACM Transactions on Networking, vol. 14, No. 5, Oct. 2006, 13p.

Guzun, "A Tunable Compression Framework for Bitmap Indices", ICDE Conference 2014, 13 p.

Otoo, "Accelerating Queries on Very Large Datasets", Scientific Data Management, 1st edition, Feb. 1, 2009, 34p.

Anonymous, "Method and System for Managing Cache of Copy Service Metadata Initialized After Volume Creation", IPCOM000221079D, Aug. 28, 2012, 3p.

* cited by examiner

```
                                                                 ┌─600
  ◁──────── Initiate operation to demote cache control block ────────▷

┌─602                     ┌─604
                          ╱╲                      Yes    ┌──────────────────────┐
                        ╱    ╲                           │   Demote cache control│
                      ╱ Does    ╲                        │   block and track     │
                    ╱  flag bit or byte for ╲  ─────────▶└──────────────────────┘
                   │  the cache control block│                           ▲
                    ╲  for track indicate   ╱                            │
                      ╲    inactive?      ╱                               │
                        ╲    ╱                                           │
                          ╲╱                                   ┌─608     │
                           │ No                                          │
                          ┌─606                         ┌──────────────────────┐
                          ╱╲            Yes             │   Obtain lock on      │
                        ╱    ╲  ──────────────────────▶│   fake queue          │
                      ╱ Is cache control ╲             └──────────────────────┘
                     │  block fake?       │                       │
                      ╲                  ╱                         ▼
                        ╲    ╱                           ┌──────────────────────┐
                          ╲╱                             │  Remove indication of │
                           │ No           ┌─612          │  cache control block  │
        ┌──────────────────────────────┐               │  from fake queue      │
        │ Lock cache line including bit  │               └──────────────────────┘
        │ in active track data structure │                       │
        │ for the cache control block    │                       └─610
        └──────────────────────────────┘
                           │                                      ┌─618
        ┌──────────────────────────────┐      ┌─614
        │ Set the bit in the active track │              ┌──────────────────────┐
        │ data structure in the locked    │              │  Release lock on the  │
        │ cache line for the cache control │              │  cache line           │
        │ block to indicate inactive      │              └──────────────────────┘
        └──────────────────────────────┘
                           │                      ┌─616
        ┌──────────────────────────────┐
        │ Set the flag bit or byte in the │ ──────────▶
        │ cache control block for the     │
        │ track to indicate inactive      │
        └──────────────────────────────┘
```

FIG. 6

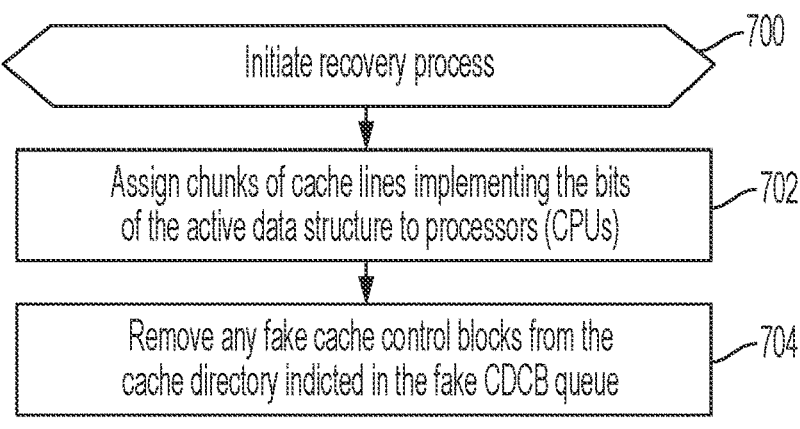

```
                                                                 ┌─700
  ◁──────────────── Initiate recovery process ──────────────────▷

┌──────────────────────────────────────────────────┐     ┌─702
        │ Assign chunks of cache lines implementing the bits  │
        │ of the active data structure to processors (CPUs)   │
        └──────────────────────────────────────────────────┘
                                    │
        ┌──────────────────────────────────────────────────┐     ┌─704
        │ Remove any fake cache control blocks from the       │
        │ cache directory indicted in the fake CDCB queue     │
        └──────────────────────────────────────────────────┘
```

FIG. 7

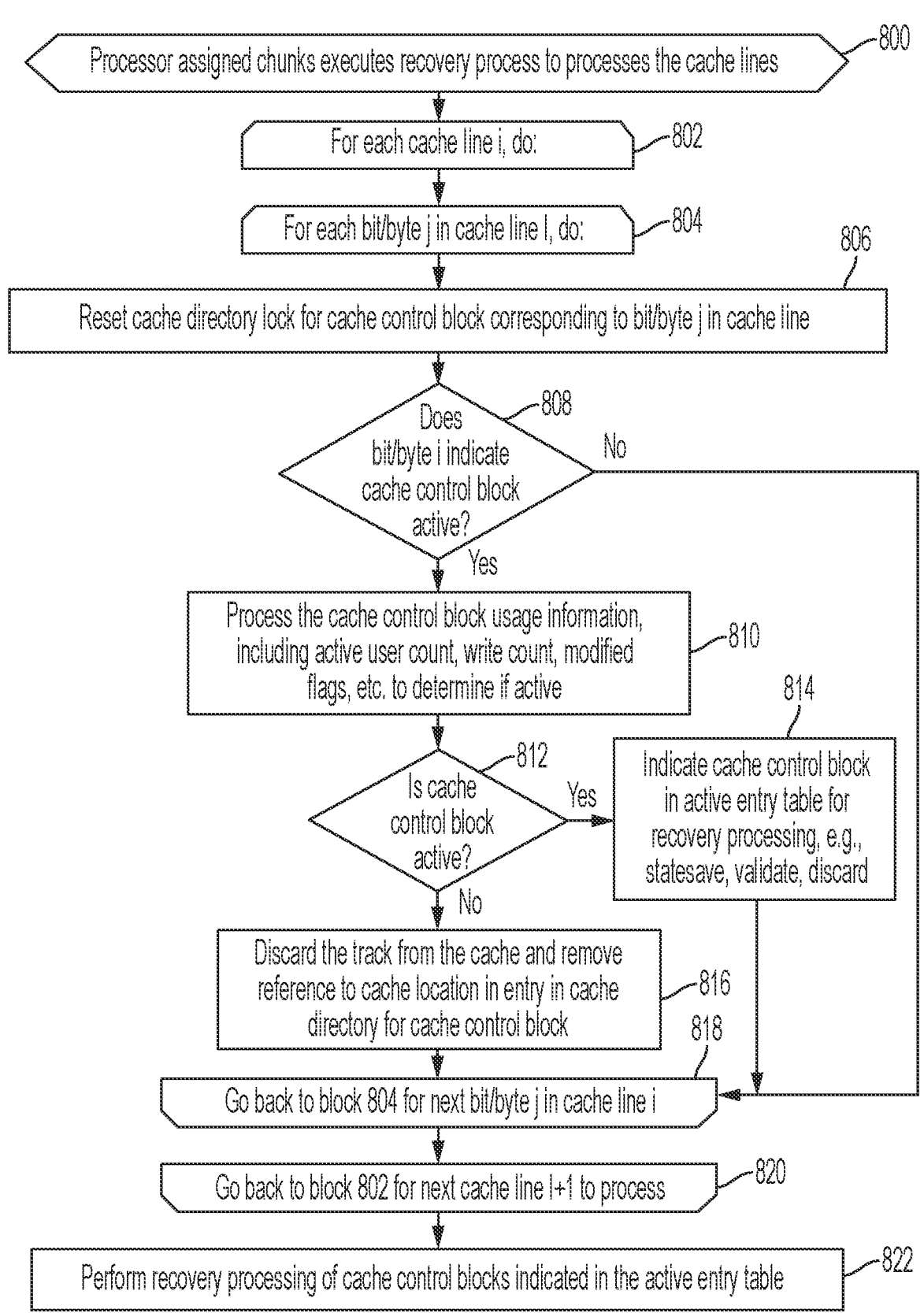

Processor assigned chunks executes recovery process to processes the cache lines ～800

For each cache line i, do: ～802

For each bit/byte j in cache line I, do: ～804

Reset cache directory look for cache control block corresponding to bit/byte j in cache line ～806

Does bit/byte i indicate cache control block active? ～808

No

Yes

Process the cache control block usage information, including active user count, write count, modified flags, etc. to determine if active ～810

Is cache control block active? ～812

Yes

No

Indicate cache control block in active entry table for recovery processing, e.g., statesave, validate, discard ～814

Discard the track from the cache and remove reference to cache location in entry in cache directory for cache control block ～816

Go back to block 804 for next bit/byte j in cache line i ～818

Go back to block 802 for next cache line I+1 to process ～820

Perform recovery processing of cache control blocks indicated in the active entry table ～822

FIG. 8

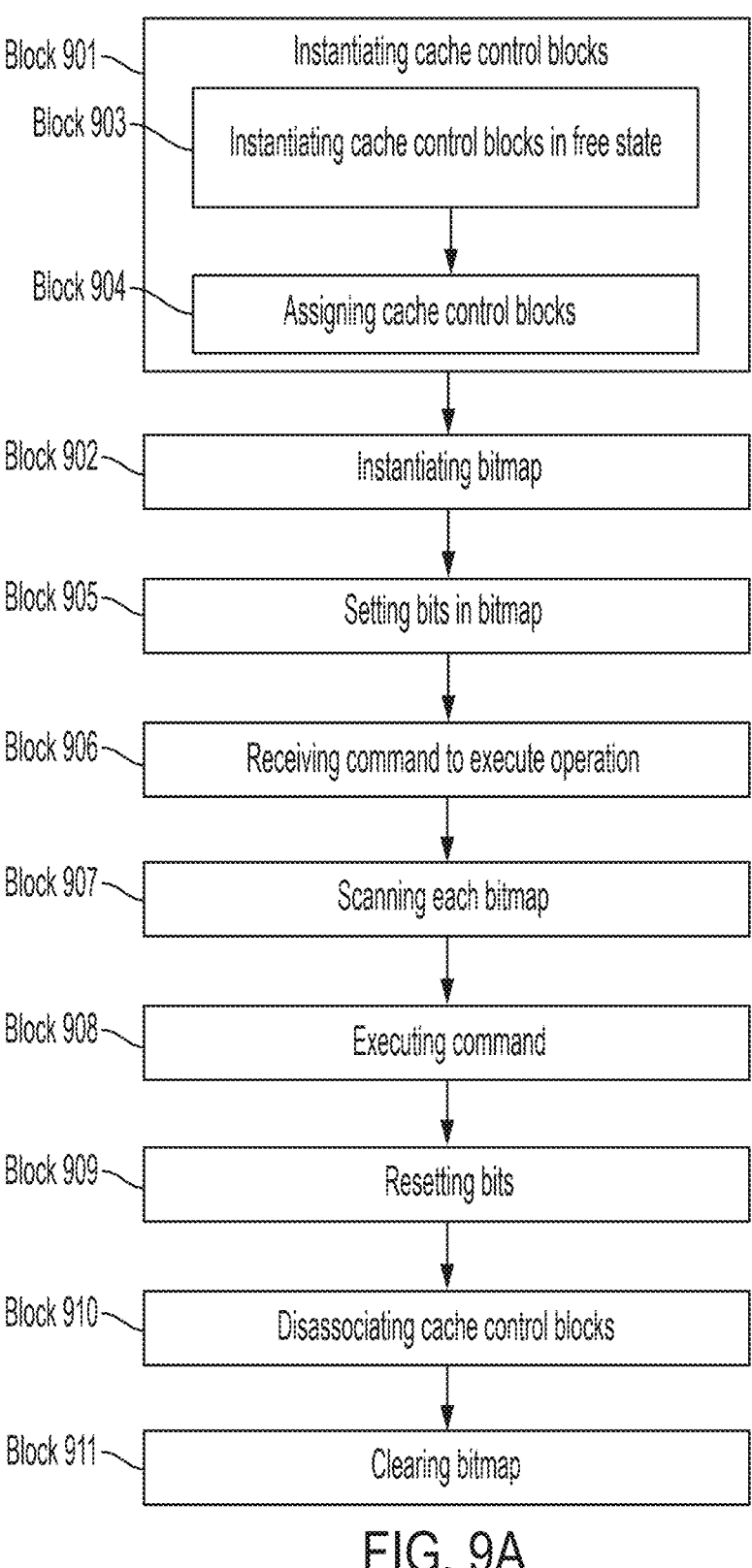

Block 901 — Instantiating cache control blocks

Block 903 — Instantiating cache control blocks in free state

Block 904 — Assigning cache control blocks

Block 902 — Instantiating bitmap

Block 905 — Setting bits in bitmap

Block 906 — Receiving command to execute operation

Block 907 — Scanning each bitmap

Block 908 — Executing command

Block 909 — Resetting bits

Block 910 — Disassociating cache control blocks

Block 911 — Clearing bitmap

FIG. 9A

SPEEDING CACHE SCANS WITH A BYTEMAP OF ACTIVE TRACKS WITH ENCODED BITS

BACKGROUND

The present invention generally relates to maintaining a bitmap to identify tracks in a cache, and more specifically, to speeding cache scans with a bitmap to identify tracks in a cache.

A cache management system buffers tracks in a cache that tends to offer faster responses than other types of storage devices. Subsequent read requests to tracks in the cache are returned at a faster rate than returning the requested tracks from the slower storage devices, thus reducing read latency. A similar advantage in reduced write latency is present with a cache versus other types of storage devices as well.

SUMMARY

Embodiments of the present invention are directed to a computer-implemented method for managing tracks in a cache is provided. The computer-implemented method includes instantiating cache control blocks to each manage operations for one of the tracks and instantiating a bitmap corresponding to each of the cache control blocks. Each bitmap includes an active bit indicating whether the one of the tracks for which the corresponding cache control block manages operations is active and additional bits indicating additional characteristics of the one of the tracks for which the corresponding cache control block manages operations.

As a result of an execution of the computer-implemented method, embedded coding of a bitmap will increase a speed of a cache scan.

In accordance with additional or alternative embodiments of the invention, the additional bits for each bitmap include at least one or more of a pinned bit, a modified bit, a metadata bit, a transfer bit and a restore bit.

In accordance with additional or alternative embodiments of the invention, the instantiating of the cache control blocks includes instantiating the cache control blocks in a free state and the computer-implemented method further includes assigning each of the cache control blocks to the one of the tracks in response to an operation relative to the one of the tracks being commanded.

In accordance with additional or alternative embodiments of the invention, the computer-implemented method further includes setting the active bit and corresponding ones of the additional bits in each bitmap following completion of an operation of the cache control block relative to the one of the tracks.

In accordance with additional or alternative embodiments of the invention, the computer-implemented method further includes receiving a command to execute an operation relative to at least a portion of the tracks having a characteristic associated with the operation, scanning each bitmap to identify, from the active bit and the additional bits in each bitmap, each of the cache control blocks managing operations of tracks having the characteristic and executing the operation via each of the cache control blocks managing operations of tracks having the characteristic.

In accordance with additional or alternative embodiments of the invention, the computer-implemented method further includes re-setting the active bit and corresponding ones of the additional bits in each bitmap corresponding to the cache control blocks managing the operations of the tracks having the characteristic following completion of the operation.

In accordance with additional or alternative embodiments of the invention, the computer-implemented method further includes disassociating ones of the cache control blocks from corresponding ones of the tracks and clearing the active bit and the additional bits in each bitmap corresponding to the ones of the cache control blocks.

Embodiments of the invention further provide computer program products and computer systems having substantially the same features and technical benefits as the above-described computer-implemented methods.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 illustrates operations to demote a cache control block from the cache in accordance with one or more embodiments of the present invention;

FIG. 7 illustrates operations to initiate recovery processing in accordance with one or more embodiments of the present invention;

FIG. 8 illustrates operations by a processor assigned a chunk of cache lines to execute the recovery process to determine active tracks in accordance with one or more embodiments of the present invention;

FIGS. 9A, 9B and 9C are flow diagrams illustrating a computer-implemented method of managing tracks in a cache in accordance with one or more embodiments of the present invention;

Figure 1:
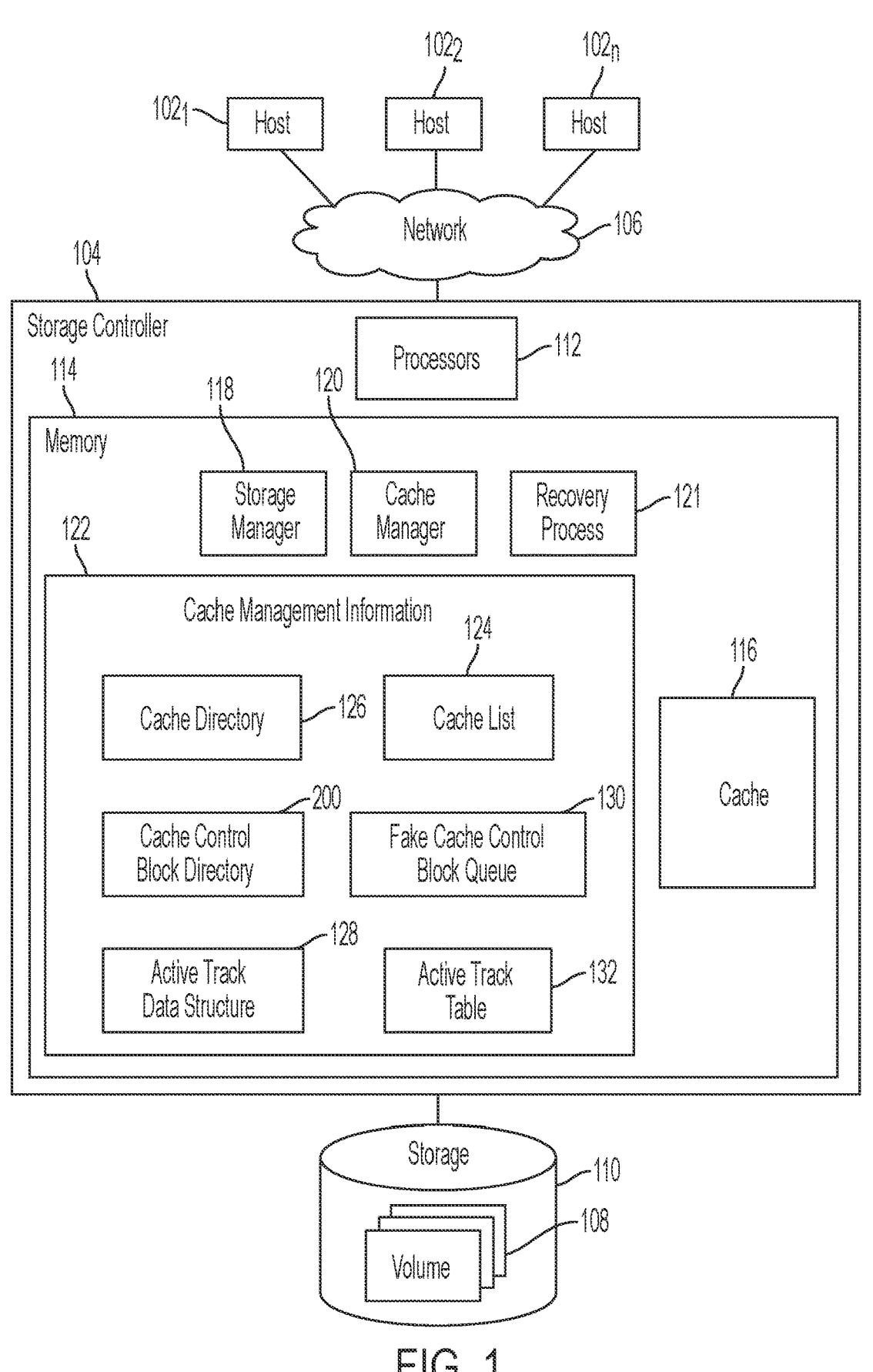
FIG. 1 illustrates a computing environment in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Turning now to an overview of technologies that are more specifically relevant to aspects of the invention, storage controller microcode may experience a failure condition that is due to hardware components or software code issues. A first action after a failure and toward recovery is to go through a warmstart to collect debug data and then do a recovery. To collect debug data and subsequently perform the recovery, a cache needs to generate a table of active tracks. An active track is one which was under some sort of processing state which is identified with user counts, lock counts, modified counts, waiters, fake cache directory control block (CDCB), etc. These active tracks are validated, cleaned (or discarded) and/or statesaved during warmstart. Cache tracks that are not active do not need to be handled for a general purpose active entry warmstart.

To generate the active entry table, an entire cache is scanned by walking through the cache directory, also referred to as a scatter index table (SIT). This scanning is done in parallel by all CPUs by breaking the SIT into equal size chunks. CPUs keep processing one chunk at a time in parallel until all chunks are processed. Since this design has to look at the entire cache for tracks to be processed during the warmstart, this results in linear scaling with cache size if the numbers of processors and memory speed do not change. For example, it can take 1.75 seconds to scan a 2 TB cache.

Thus, there is a need in the art for improved techniques to determine active tracks in cache to process during a recovery operation.

Turning now to an overview of the aspects of the invention, one or more embodiments of the invention address shortcomings of the above-described approach by providing for an instantiation of cache control blocks to each manage operations for one of the tracks of a cache and an instantiation of a bitmap corresponding to each of the cache control blocks. Each bitmap includes an active bit indicating whether the one of the tracks for which the corresponding cache control block manages operations is active and additional bits indicating additional characteristics of the one of the tracks for which the corresponding cache control block manages operations.

The above-described aspects of the invention address the shortcomings of known approaches by providing for bitmaps with embedded coding where, when a state of a track is changed, the embedded coding of the corresponding bitmap will be changed to indicate the state of the track. For example, if a track becomes pinned, a corresponding bit is set in the embedded coding of the corresponding bitmap and, if a track becomes unpinned, a corresponding bit is re-set in the embedded coding. Similarly, if a track becomes modified, a bit corresponding to the modification is set in the embedded coding of the corresponding bitmap. The embedded coding of the bitmaps can then be used to identify those tracks which are engaged by subsequent read or write operations.

Turning now to a more detailed description of aspects of the present invention, FIG. 1 illustrates a computing environment. A plurality of hosts $102_1, 102_2 \ldots 102_n$ may submit input/output (I/O) requests to a storage controller 104 over a network 106 to access data at volumes 108 (e.g., logical unit numbers, logical devices, logical subsystems, etc.) in a storage 110. The storage controller 104 includes one or more processors 112 and a memory 114, including a cache 116 to cache data for the storage 110. The processors 112 may include a separate central processing unit (CPU), one or a group of multiple cores on a single CPU, or a group of processing resources on one or more CPUs. The cache 116 buffers data transferred between the hosts $102_1, 102_2 \ldots 102_n$ and volumes 108 in the storage 110.

The memory 114 further includes a storage manager 118 for managing the transfer of tracks transferred between the hosts $102_1, 102_2 \ldots 102_n$ and the storage 110; a cache manager 120 that manages data transferred between the hosts $102_1, 102_2 \ldots 102_n$ and the storage 110 in the cache 116; and a recovery process 121 to perform an initialization of the storage controller 104, such as may occur if the storage controller 104 operating system is abnormally terminated or otherwise restarted. A track may include or be provided as any unit of data configured in the storage 110, such as a track, a logical block address (LBA), a storage cell, a group of cells (e.g., column, row or array of cells), sector, segment, etc., which may be part of a larger grouping of tracks, such as a volume, logical device, etc.

In certain implementations, such as with the International Business Machines Corporation ("IBM") Z/OS® operating system, each segment may have an associated descriptor referred to as a cache segment control block (CSCB), where one of the CSCBs is cast as a cache control block. The cache 116 may be divided into 4K segments. Each track in a cache can have up to seventeen CSCBs. One of the CSCBs in the track is designated as the CDCB and holds all the track related control information. There can be one cache control block for each track in the cache 116 providing metadata on the track in the cache 116.

The recovery process 121 performs a system initialization of the storage controller 104 to recover state information from existing data structures to provide a faster initialization and recovery than a cold start. In enterprise storage controllers, such as the IBM DS8000™ storage controllers, the recovery process, which may be referred to as a "warmstart", may be used as both a debug mechanism and a recovery method. The recovery process 121 may initiate a state-save operation to collect state-save data. This state-save data may have data structures that are deemed necessary to analyze the problem or condition that necessitated the recovery. The recovery process 121 may reinitialize data structures in the storage controller 104, rebuild linked lists, and restore the storage controller 104 to a more known state. During the recovery, there are periods of time where I/O may be blocked and therefore must be re-driven.

The cache manager 120 maintains cache management information 122 in the memory 114 to manage read (unmodified) and write (modified) tracks in the cache 116. The cache management information 122 may include a least recently used (LRU) cache list 124 to indicate tracks in the cache 116 to determine which track to demote from the cache 116; a cache directory 126 providing an index of cache control blocks $200_i$ or segment descriptors to locations of segments in the cache having the cache control block $200_i$ or a segment identified in the cache directory 126; an active track data structure 128 indicating active tracks in the cache 116; a fake cache control block queue 130 indicating cache control blocks represented by alternative data structures when there are no remaining cache control blocks to allocate; and an active track table 132 generated during the recovery process 121 to indicate active tracks in the cache 116 for recovery processing.

The active track data structure 128 may include a bitmap having a bit or a byte for each segment in the cache 116. A track may be allocated multiple segments in the cache 116, and the cache control block $200_i$ for a track, having metadata for the track, may reside in one of the segments allocated to the track. The bit or byte in the active track data structure 128 bitmap corresponding to the cache control block $200_i$ for the track may be set to indicate the whether the track is active or inactive and to indicate additional information as well. The bit or byte in the active track data structure 128 bitmap representing segments having track data and not the cache control block $200_i$ can be left unused. Portions or bits of the active track data structure 128 bitmap may be implemented in cache lines that need to be locked to process the bits to determine whether corresponding cache control blocks $200_i$ are active.

The cache directory 126 may indicate cache control blocks $200_i$ for tracks in the cache 116 and alternative data structures, also known as fake cache control blocks, that represent cache control blocks when there are no more segments to assign to a track to add to cache. In such case, a fake cache control block can be added to the cache directory 126 so that there is only one request pending to allocate a cache control block for a track. The data for the track for which a fake cache control block is created is not stored in the cache 116 until a cache control block $200_i$ is allocated to replace the fake cache control block. The fake cache control block may be implemented as a task control block (TCB), which may have cache control block $200_i$ information, such as the fake flag 210 and an identifier 202.

In certain embodiments, the cache directory 126 may be implemented as a scatter index table, where a track address or cache control block identifier is hashed to an entry in the table. If the cache 116 has data for that cache control block or track, the entry in the cache directory 126 to which the value hashes would have a pointer to a location in cache 116 where the cache control block $200_i$ segment for a track is stored.

The storage manager 118, cache manager 120, and recovery process 121 are shown in FIG. 1 as program code loaded into the memory 114 and executed by one or more of the processors 112. Alternatively, some or all of the functions may be implemented as microcode or firmware in hardware devices in the storage controller 104, such as in application specific integrated circuits (ASICs).

The storage 110 may include one or more storage devices known in the art, such as a solid state storage device (SSD) including solid state electronics, NAND storage cells, electrically erasable programmable read-only memory (EE-PROM), flash memory, flash disk, random access memory (RAM) drive, storage-class memory (SCM), phase change memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as just a bunch of disks (JBOD), direct access storage device (DASD), redundant array of independent disks (RAID) array, virtualization device, etc. Further, the storage devices may include heterogeneous storage devices from different vendors or from the same vendor.

The memory 114 may include a suitable volatile or non-volatile memory devices, including those described above.

The network 106 may include a storage area network (SAN), a local area network (LAN), a wide area network (WAN), the Internet, and Intranet, etc. Alternatively, the hosts $102_1$, $102_2$ . . . $102_n$ can connect to the storage controller 104 over a bus interface, such as a peripheral component interconnect (PCI) bus interface and other interfaces known in the art.

Figures 2A, 2B:
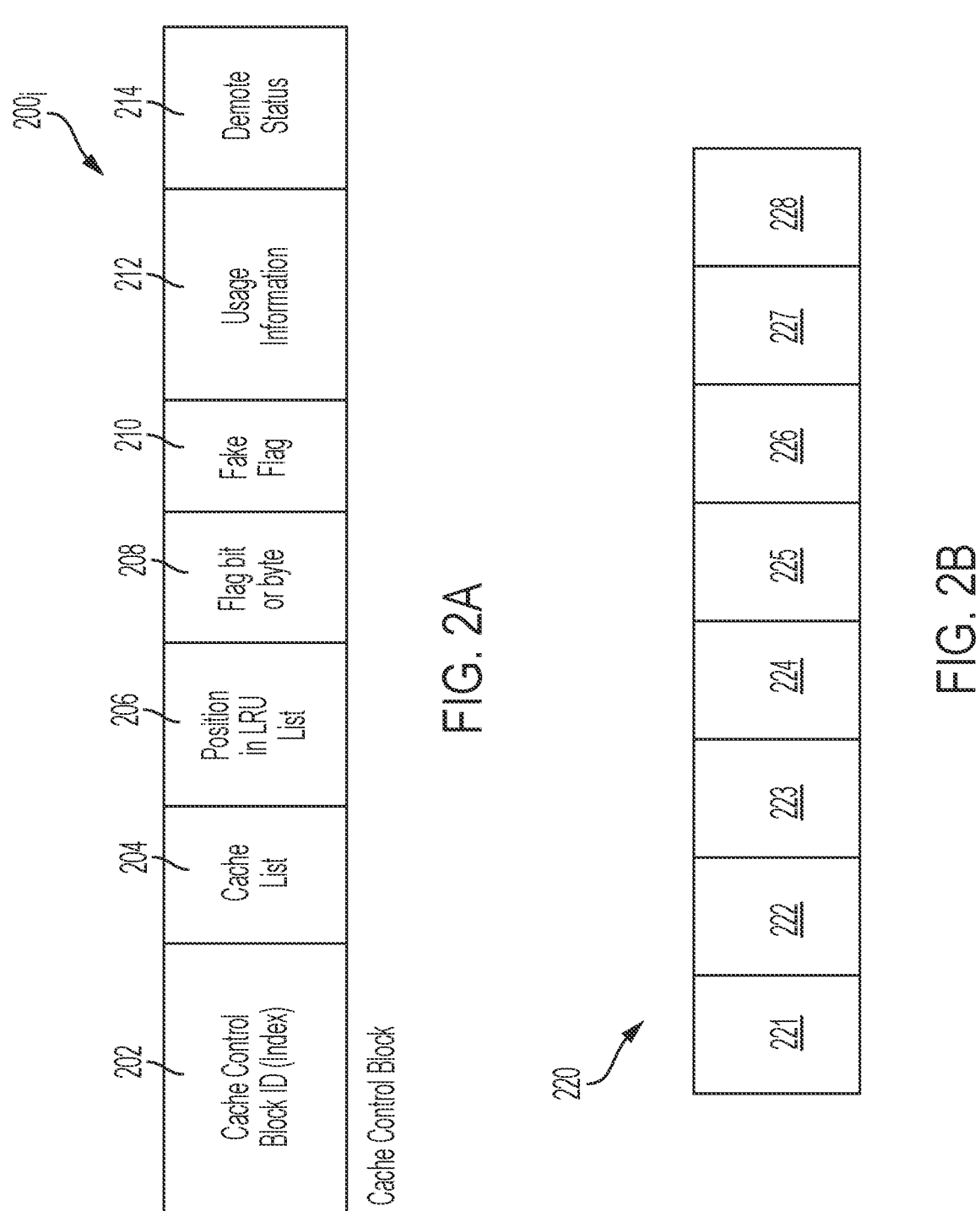
FIG. 2A illustrates a cache control block in accordance with one or more embodiments of the present invention.
FIG. 2B illustrates a bitmap for the cache control block of FIG. 2A in accordance with one or more embodiments of the present invention.

FIG. 2A illustrates an instance of a cache control block $200_i$. Once instantiated, the cache control block $200_i$ can be assigned to a track in the cache 116. The cache control block $200_i$ can include a cache control block identifier 202, such as an index value of the cache control block $200i$, a cache list 204 in which the track associated cache control block $200_i$ is indicated, a position in the LRU cache list 206 where the track is indicated, a flag bit or byte 208 indicating whether the track is indicated as active in the active track data structure 128 along with other information, a fake flag 210 indicating whether the cache control block 202 is in fact not implemented with cache segments, but instead implemented with an alternative data structure, such as a task control block, usage information 212 providing usage statistics on the track in the cache, such as active user count, active write count, lock counts, modified count, waiters, etc., and a demote status 214 indicating whether the track identified by the cache control block $200_i$ is to be demoted from the cache 116. Additional information may be included in the cache control block $200_i$ not mentioned herein that is used to manage the track in the cache 116.

The flag bit or byte 208 provides for an indication of whether the active track data structure 128 indicates the corresponding track is active. This allows a process to determine that the track is active without having to obtain a lock on the cache line to read the bit in the active track data structure 128 for the cache control block $200_i$. This allows processes during normal operations to determine whether the bit or byte in the active track data structure 128 needs to be reset without having to lock the cache line having the bit to read to determine if that bit indicates active or inactive.

With reference to FIG. 2B, a bitmap 220 can also be instantiated for each cache control block $200_i$ for each track in the cache 116. The bitmap 220 includes an active bit 221 as well as additional bits 222-228 and allows for encoding in the bitmap 220 information about a state of the corresponding cache control block $200_i$ and of the corresponding track, such as whether the corresponding track is active or inactive, whether the corresponding track is modified, whether the corresponding track is pinned, whether the corresponding track is marked for transfer, whether the corresponding track is metadata or customer data and whether the corresponding track is to be restored from non-volatile storage (NVS). In an exemplary case, the bitmap 220 can include the active bit 221, indicating whether the corresponding track is active or inactive, a metadata bit 222 that is set to indicate whether the corresponding track is for metadata or customer data, a pinned bit 223 that is set to indicate whether the corresponding track is pinned or unpinned, a modified bit 224 that is set to indicate whether the corresponding track has been modified and an NVS restore bit 225 that is set to indicate whether the corresponding track is to be restored. Additional bits 226, 227 and 228 can be associated with still other track characteristics.

The flag bit or byte 208 in the cache control block 200$i$ can be similarly set and updated to correspond to the state of each of the active bit 221 and the additional bits 222-228 in the bitmap 220.

Figure 3:
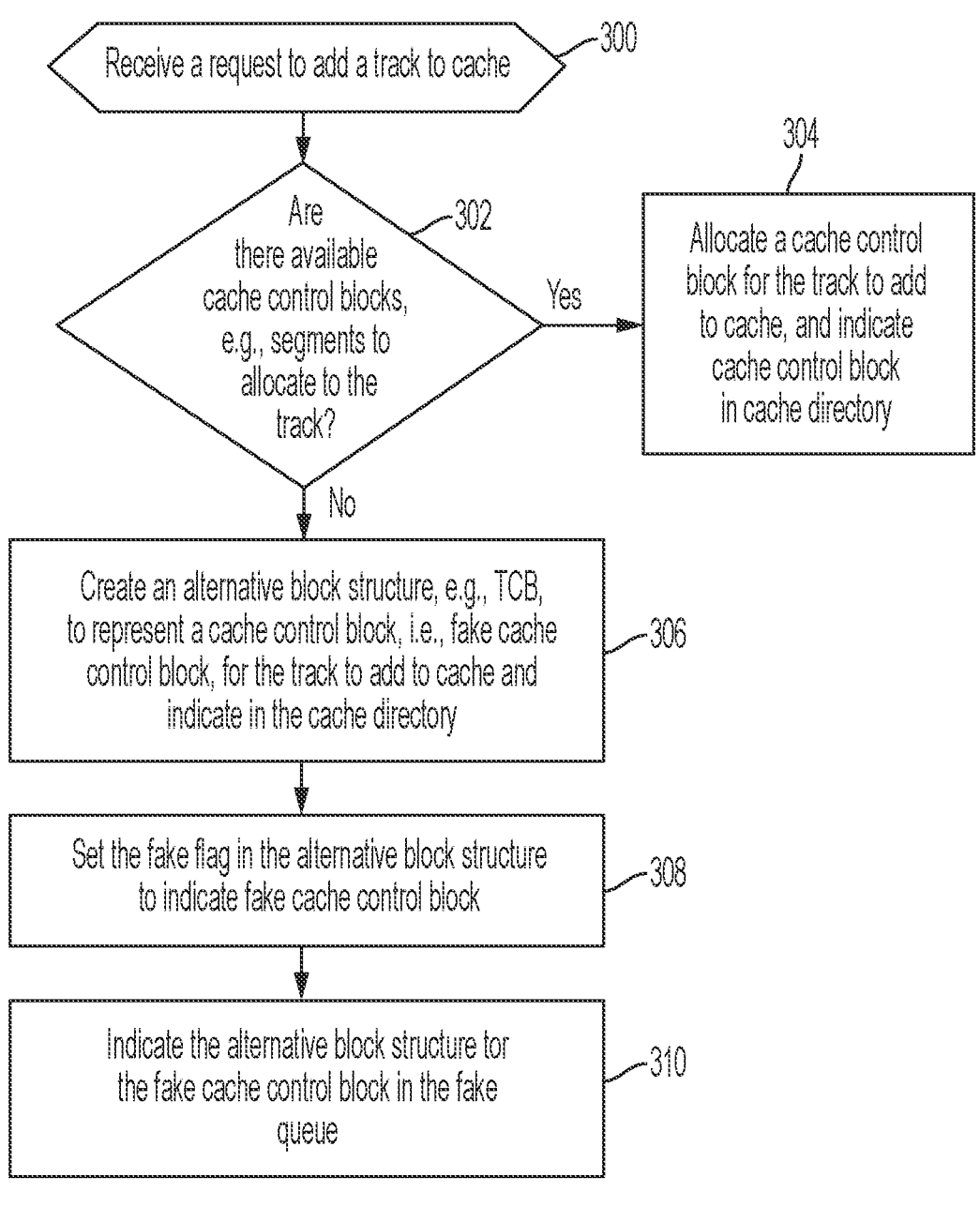
FIG. 3 illustrates operations to process a request to add a track to the cache in accordance with one or more embodiments of the present invention.

FIG. 3 illustrates an embodiment of operations performed by the cache manager 120 to process a request to add a track to the cache 116 from one of the hosts 102$_1$, 102$_2$ . . . 102$_n$. Upon receiving (at block 300) a request to add a track to the cache 116, a determination is made if there are available segments in the cache 116 to allocate a cache control block 200$i$ for the request. If (at block 302) there are available segments, then a new cache control block 200$i$ is allocated (at block 304) and indicated in the cache directory 126 for the track. The track may then be added to the cache 116. If (at block 302) there are not available segments, or cache segment control blocks to allocate a cache control block 200$i$ to the track, then the cache manager 120 creates (at block 306) an alternative block structure, such as a task control block, to represent a cache control block, also known as a fake cache control block. This fake cache control block may be indicated in the cache directory 126. The fake flag 210 in the alternative block data structure is set (at block 308) to indicate the cache control block is fake, or a placeholder until segments are available to allocate for a cache control block 200$i$. The alternative block structure for the fake cache control block is indicated (at block 310) in the fake cache control block queue 130.

With the embodiment of operations of FIG. 3, information on a fake cache control block is indicated in the fake queue 130 to allow for fast determination of fake cache control blocks during warmstart or recovery processing. This allows for a fast determination of the fake cache control blocks that may be discarded because there is no data in the cached 116 for fake cache control blocks.

Figure 4:
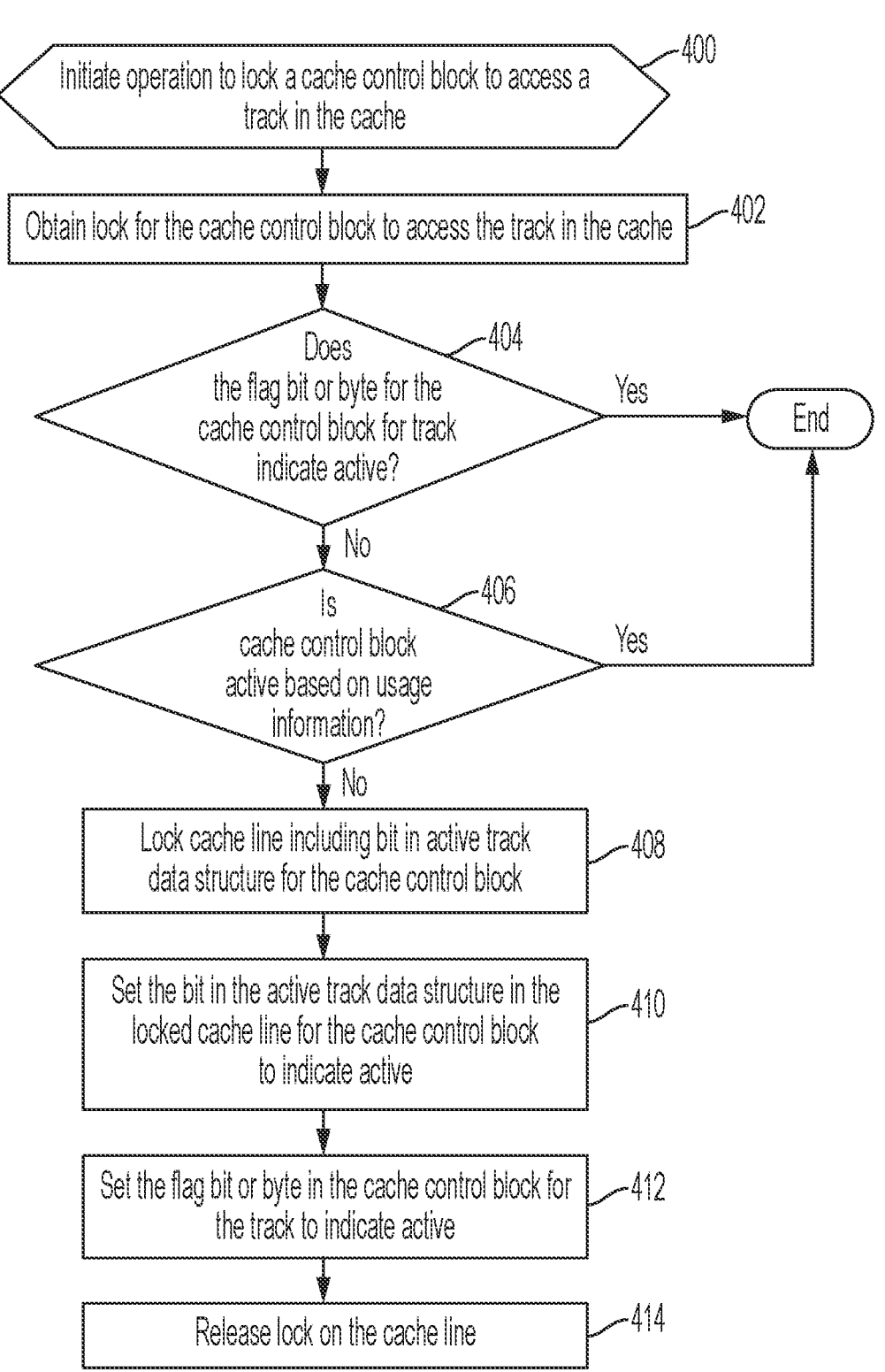
FIG. 4 illustrates operations to lock a cache control block to access a track in the cache in accordance with one or more embodiments of the present invention.

FIG. 4 illustrates an embodiment of operations performed by the cache manager 120 to lock a cache control block 200$i$ to access a track in the cache 116. Upon initiating (at block 400) the operation to obtain a lock on the cache control block 200$i$, the cache manager 120 obtains (at block 402) a lock for the cache control block 200$i$ to access, which may be obtained through the cache directory 126. If (at block 404) the flag bit or byte 208 for the cache control block 200$i$ indicates active, then control ends because this is the correct setting for a cache control block 200$i$ being accessed. If (at block 404) the flag bit or byte 208 does not indicate active and if (at block 406) a determination is made that the cache control block is not active based on usage information, then the cache manager 120 obtains (at block 408) a lock on the cache line including the bit in the active track data structure 128 for the cache control block 200$i$. The corresponding bit in the locked cache line is then set (at block 410) to indicate active as the cache control block 200$i$ and track are being accessed. The flag bit or byte 208 in the cache control block 200$i$ is also set to indicate active. The lock on the cache line including the set bit for the cache control block 200$i$ in the active track data structure 128 is then released.

With the embodiment of operations of FIG. 4, upon accessing a cache control block 200$i$ to access the track in the cache 116, a determination is made as to whether the active bit in the active track data structure 128 needs to be updated. In certain embodiments, to determine if an update is needed, an exclusive lock is obtained on the cache line having the bit to update by checking a flag bit or byte 208 in the cache control block to determine whether the active track data structure 128 does in fact need to be updated. This optimization avoids the need to lock and access a bit in the active track data structure 128 by first checking if the active bit needs to be set. Further, the active track data structure 128 is updated with current information on an active status for a track to maintain the active track data structure 128 with current information on active track status to further optimize a warmstart or recovery operation.

Figure 5:
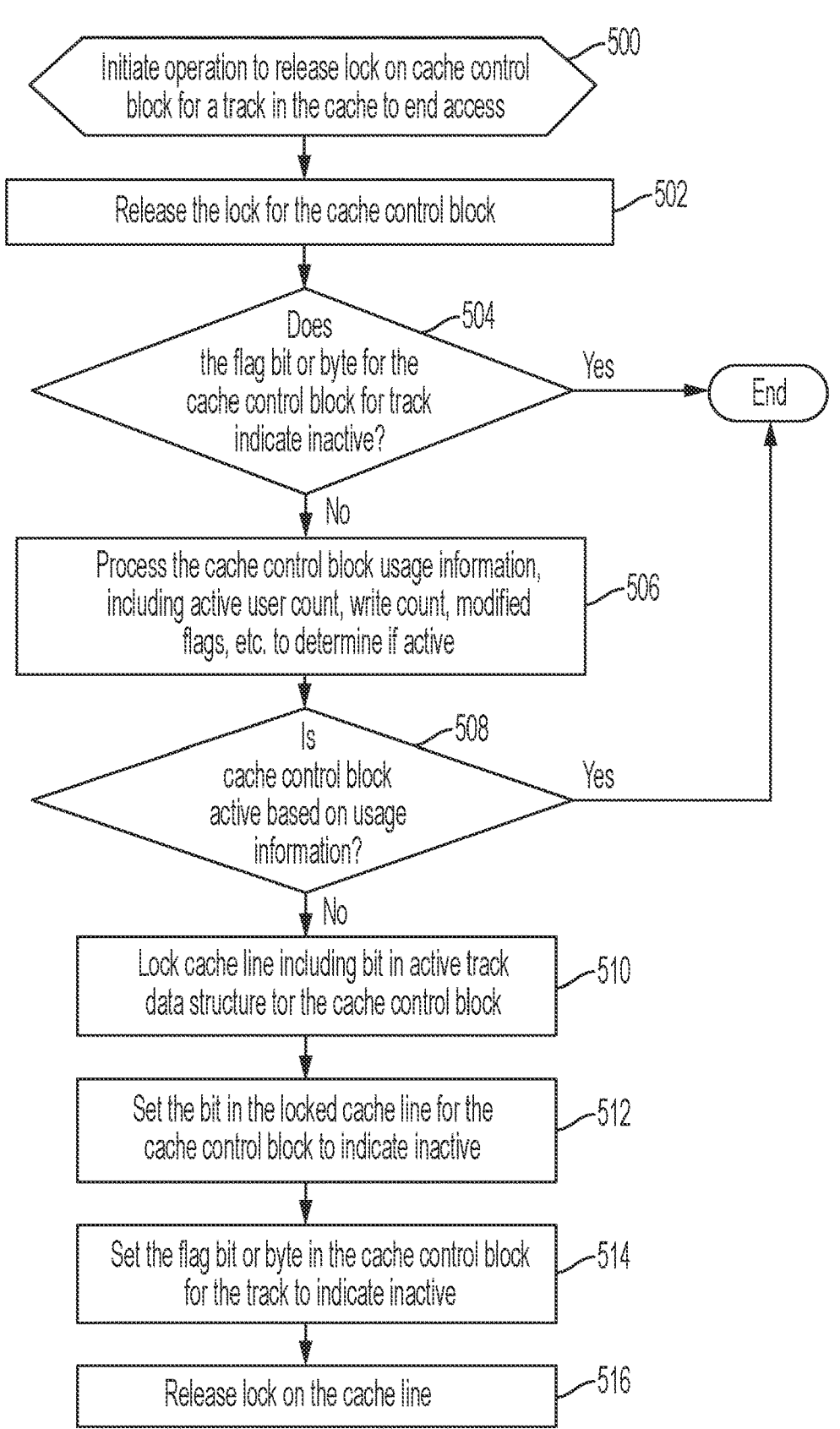
FIG. 5 illustrates operations to release a lock to a cache control block in accordance with one or more embodiments of the present invention.

FIG. 5 illustrates an embodiment of operations performed by the cache manager 120 to release a lock on a cache control block 200$i$ after completing access to a track in the cache 116. Upon initiating (at block 500) an operation to release a lock for a cache control block 200$i$, the cache manager 120 releases (at block 502) the lock. If (at block 504) the flag bit or byte 208 for the cache control block 200$i$ indicates inactive, then control ends because that is the correct state because access to the cache control block 200$i$ is being relinquished. If (at block 504) the flag bit or byte 208 indicates active, then the cache manager 120 processes (at block 506) the cache control block usage information 212, such as an active user count, write count, modified flags, etc. to determine if the track is active based on usage information 212. If (at block 508) the cache control block 200$i$ is in fact active, then control ends because the active track data structure 128 indicates the active state.

If (at block 508) the usage information 212 indicates the track is not active, contradicting the flag bit or byte 208, then the cache manager 120 locks (at block 510) the cache line including the bit in the active track data structure 128 for the cache control block 200$i$ and sets (at block 512) the bit in the locked cache line for the cache control block 200$i$ to indicate inactive. The flag bit or byte 208 in the cache control block 200$i$ is set (at block 514) to indicate inactive. The lock on the cache line is then released (at block 516).

With the embodiment of operations of FIG. 5, upon releasing access to a track/cache control block 200$i$, a determination is made as to whether the active bit in the active track data structure 128 needs to be updated to indicate inactive by checking a flag bit or byte 208 in the cache control block to determine whether the active track data structure 128 does in fact need to be updated to indicate inactive. This optimization avoids the need to lock and access a bit in the active track data structure 128 by checking if the flag bit or byte 208 indicates the bit in the active data structure 128 needs to be reset. Further, if the flag bit or byte 208 indicates the track is inactive, then the cache manager 120 confirms that other usage information 212 indicate that the track is still active even though the active track data structure 128/flag bit or byte 208 indicates the track is not active. If the track is determined to be active even though the flag bit or byte 208 and the active track data structure 128 indicates the track is inactive, then the information needs to be reset to indicate active for the track to reflect the current status of the track based on the usage information 212. This updates the active track data structure 128 with current information on an active status for a track to optimize a warmstart or recovery operation.

FIG. 6 illustrates an embodiment of operations performed by the cache manager 120 to demote a cache control block 200$i$ and corresponding track from the cache 116, such as using the cache list 124 to select a least recently used track to remove from the cache 116. Upon initiating (at block 600) an operation to demote a cache control block 200$i$ and corresponding track from the cache 116, if (at block 602) the flag bit or byte 208 for the cache control block 200$i$ indicates the cache control block 200$i$ is inactive, then the cache control block 200$i$ and track are demoted (at block 604). If the flag bit or byte 208 indicates active, then if (at block 606) the fake flag 210 indicates the cache control block is fake, a lock is obtained (at block 608) on the fake cache control block queue 130 and an indication of the fake cache control block is removed from the fake queue 130. At this point, control ends without demoting information because there is no allocated cache control block $200_i$ or track in cache 116 to demote as the cache control block is fake, i.e., is an alternative data structure, such as a TCB.

If (at block 606) the fake flag 210 does not indicate the cache control block $200_i$ is fake, then the cache manager 120 locks (at block 612) the cache line including the bit in the active track data structure 128 for the cache control block $200_i$ and sets (at block 614) the bit in the locked cache line for the cache control block $200_i$ to indicate inactive. The flag bit or byte 208 in the cache control block $200_i$ is set (at block 616) to indicate inactive. The lock on the cache line is then released (at block 618). Control then proceeds to block 604 to demote the cache control block $200_i$ and corresponding track from the cache 116. The cache directory 126 may also be updated to indicate there is no data in cache 116 for the demoted cache control block $200_i$.

With the embodiment of operations of FIG. 6, the active track data structure 128 is updated to indicate a cache control block $200_i$ is inactive if the cache control block is being demoted from the cache 116.

FIG. 7 illustrates an embodiment of operations performed by the recovery process 121 to initiate a recovery or warm-start initialization of the storage controller 104. Upon initiating (at block 700) a recovery, chunks of cache lines implementing the bits of the active data structure 128 are assigned (at block 702) to the processors 112 to allow parallel and concurrent processing of the chunks of cache lines implementing the active track data structure 128 to reduce the latency of the recovery process. The recovery process 121 removes (at block 704) any fake cache control blocks indicated in the fake cache control block queue 130 from the cache directory 126.

FIG. 8 illustrates an embodiment of operations performed by each processor 112, which is assigned a chunk of cache lines having the active track data structure 128, executing the recovery process 121. This allows for parallel processing of the active track data structure 128 during recovery operations by having different processors 112 execute the recovery process 121 to concurrently process the active track data structure 128 cache lines. Upon one of the processors 112 being assigned chunks of cache lines having bits of the active track data structure 128 executing (at block 800) the recovery process 121, a loop of operations is performed at blocks 802 through 822 for each cache line i assigned to the processor 112. For each cache line i, the recovery process 121 performs a loop of operations at blocks 804 through 820 for each bit or byte j in cache line. At block 806, the recovery process 121 resets (at block 806) the cache directory lock for the cache control block corresponding to bit or byte j in cache line i to unlocked. If (at block 808) bit or byte j indicates the cache control block $200_i$ is active, then the cache control block usage information 212 is processed (at block 810), including active user count, write count, modified flags, etc., to determine if the track is in fact active. If (at block 812) the cache control block $200_i$ is active, then that cache control block is indicated (at block 814) in the active track table 132 for recovery processing, such as state save, validate, discard, etc. If (at block 812) the cache control block $200_i$ corresponding to bit or byte j is not active, based on usage information 212, then control proceeds to block 814 to indicate the cache control block is in the active track table 132 for recovery processing. If (at block 816) the track is empty or needs to be discarded, then the track and cache control block $200_i$ are discarded (at block 816) from cache and the reference to a cache 116 location in the entry in the cache directory 126 for the cache control block $200_i$ is removed/voided, to indicate there is no cached data for that cache control block $200_i$ and track. From block 814 or 818, control proceeds to block 820 to process the next bit or byte j+1 in cache line i. After processing all bits in cache line i, control proceeds to block 822 to process a next cache line of the active track data structure 128 assigned to the processor 112 until all assigned cache lines are processed.

After forming an active track table 132 of all active cache control blocks $200_i$ for active tracks, the recovery process 121 performs (at block 822) recovery processing of the active cache control blocks $200_i$ indicated in the active track table 132, such as determining whether to perform a state-save for later debugging, validate, clean or discard the data.

With the embodiment of FIG. 8, concurrently executing recovery processes 121 may determine active cache control blocks using the active track data structure 128 to form an active entry table 132. This technique optimizes the processing to determine active cache control blocks $200_i$ by scanning the active track data structure 128 to determine those tracks that are active, which has substantially less latency than techniques that scan all the tracks in the cache directory 126 to determine active tracks. The active track data structure 128, by maintaining one bit for every cache segment in cache, including cache control block segments, requires substantially less scanning than scanning all the entries in the cache directory 126.

Figure 9B:
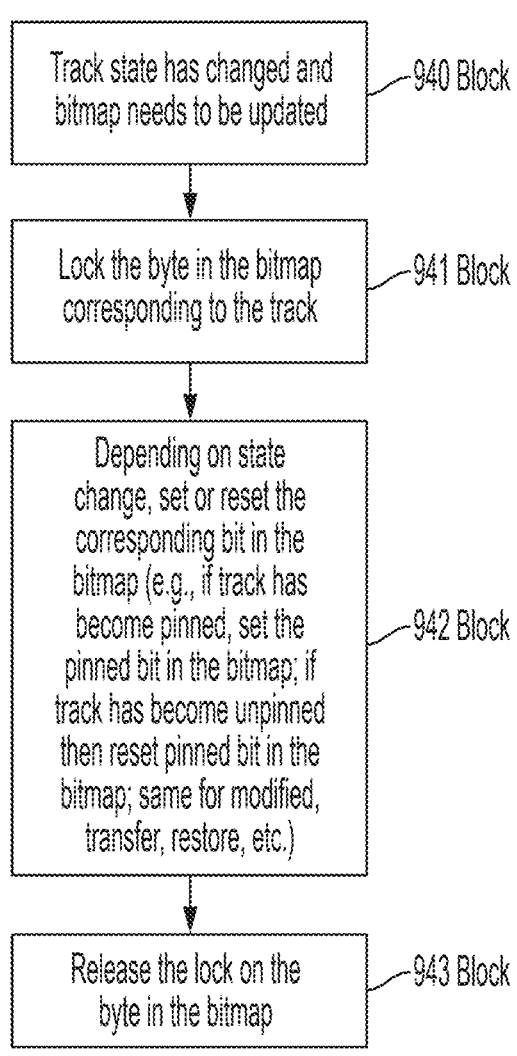
Figure 9C:
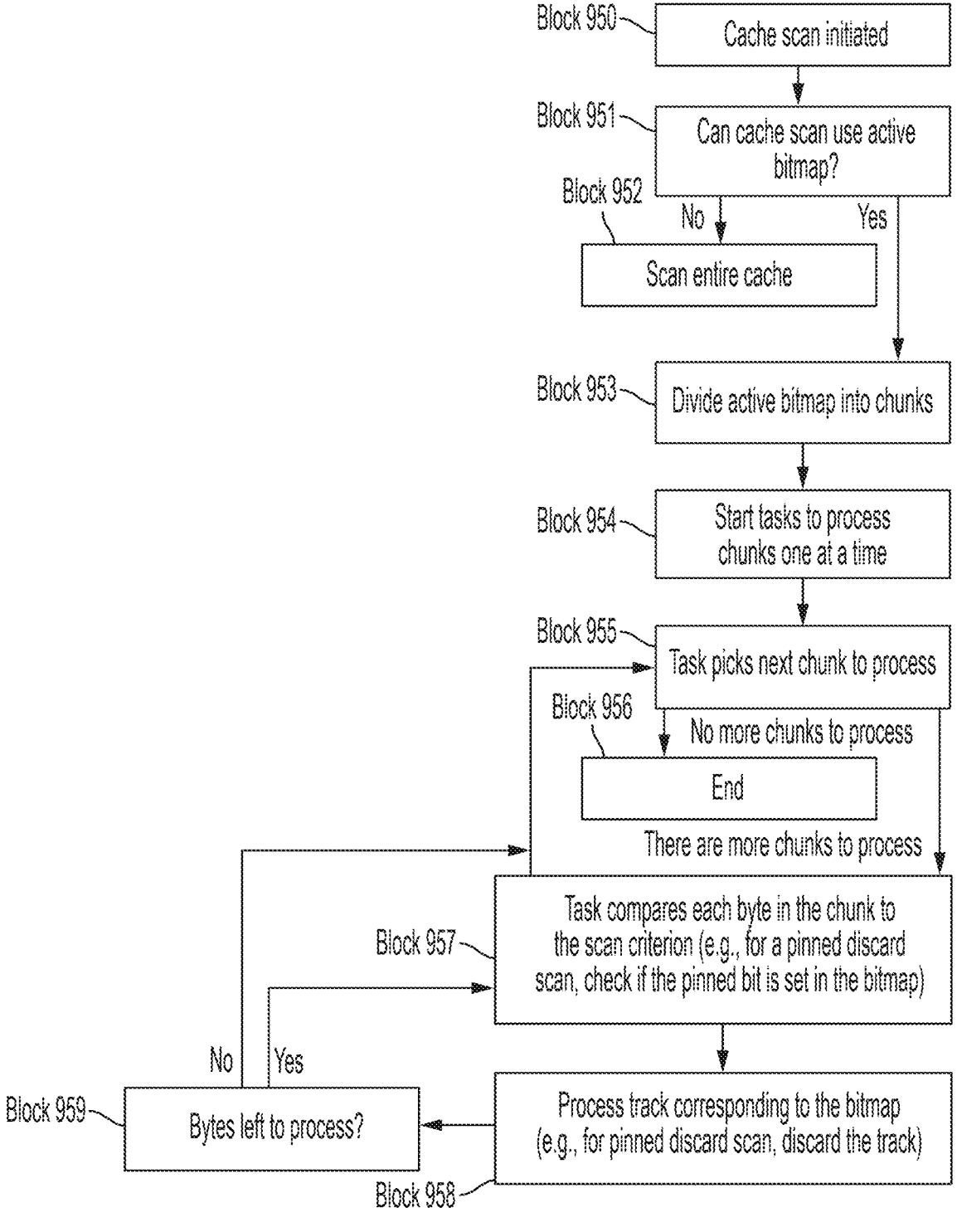

With reference to FIGS. 9A, 9B and 9C, a computer-implemented method 900 is provided for managing a track in a cache.

As shown in FIG. 9A, the computer-implemented method 900 includes instantiating cache control blocks to each manage operations for one of the tracks (block 901) and instantiating a bitmap corresponding to each of the cache control blocks (block 902). The instantiating of the cache control blocks of block 901 can include instantiating the cache control blocks in a free state (block 903) and assigning each of the cache control blocks to the one of the tracks in response to an operation relative to the one of the tracks being commanded (block 904).

As shown in FIG. 2B, each bitmap includes an active bit indicating whether the one of the tracks for which the corresponding cache control block manages operations is active and additional bits indicating additional characteristics of the one of the tracks for which the corresponding cache control block manages operations. In accordance with one or more embodiments of the present invention, the additional bits for each bitmap include at least one or more of a pinned bit, a modified bit, a metadata bit, a transfer bit and a restore bit.

At an initial time, the active bit and the additional bits in each bitmap can have empty or unfilled fields. This can change, however, following the completion of an operation of the cache control block relative to the one of the tracks at which point the active bit and the additional bits are set (block 905). Subsequently, upon a command to execute an operation relative to at least a portion of the tracks having a characteristic associated with the operation being received (block 906), the computer-implemented method 900 further includes scanning each bitmap to identify, from the active bit and the additional bits in each bitmap, each of the cache control blocks managing operations of tracks having the characteristic (block 907), executing the operation via each of the cache control blocks managing operations of tracks having the characteristic (block 908) and re-setting the active bit and corresponding ones of the additional bits in each bitmap corresponding to the cache control blocks managing the operations of the tracks having the characteristic following completion of the operation (block 909).

Once tracks are removed from the cache (i.e., due to the track being demoted and/or to make space in the cache), the computer-implemented method 900 can further include disassociating ones of the cache control blocks from corresponding ones of the tracks (block 910) and clearing the active bit and the additional bits in each bitmap corresponding to the ones of the cache control blocks (block 911).

As shown in FIGS. 9B and 9C, certain operations of blocks 902-909 of FIG. 9A will now be described in greater detail.

For example, as shown in FIG. 9B, once a track state has changed the corresponding bitmap needs to be updated (block 940). At this point, the byte in the bitmap corresponding to the track is locked (block 941) and, depending on the state change, the corresponding bit in the bitmap is set or reset (block 942). For example, if the track has become pinned, the pinned bit is set in the bitmap. If the track has become unpinned, the pinned bit is reset in the bitmap. The same would be true for modified tracks, tracks to be transferred, tracks to be restored, etc. The lock on the byte in the bitmap is the released (block 943).

As a further example, as shown in FIG. 9C, once a cache scan is initiated (block 950), it is determined whether the cache scan can use the active bitmap (block 951). If not, the entire cache is scanned (block 952). If so, the active bitmap is divided into chunks (block 953), tasks to process the chunks are started one at a time (block 954) and a task picks the next chunk to process (block 955). If there are no more chunks to process, the algorithm ends (block 956). If there are more chunks to process, the task compares each byte in the chunk to the scan criterion (block 957). For example, for a pinned discard scan, it is checked whether the pinned bit is set in the bitmap. If the bit in the bitmap does not meet the criterion of the scan, control proceeds to block 955. If the bit in the bitmap meets the criterion of the scan, the track corresponding to the bitmap is processed (block 958). For example, for a pinned discard scan, the track is discarded. It is then determined whether there are bytes left to process in the chunk (block 959). If not, control proceeds to block 955. If there are bytes left to process, control proceeds to block 957.

Figure 10:
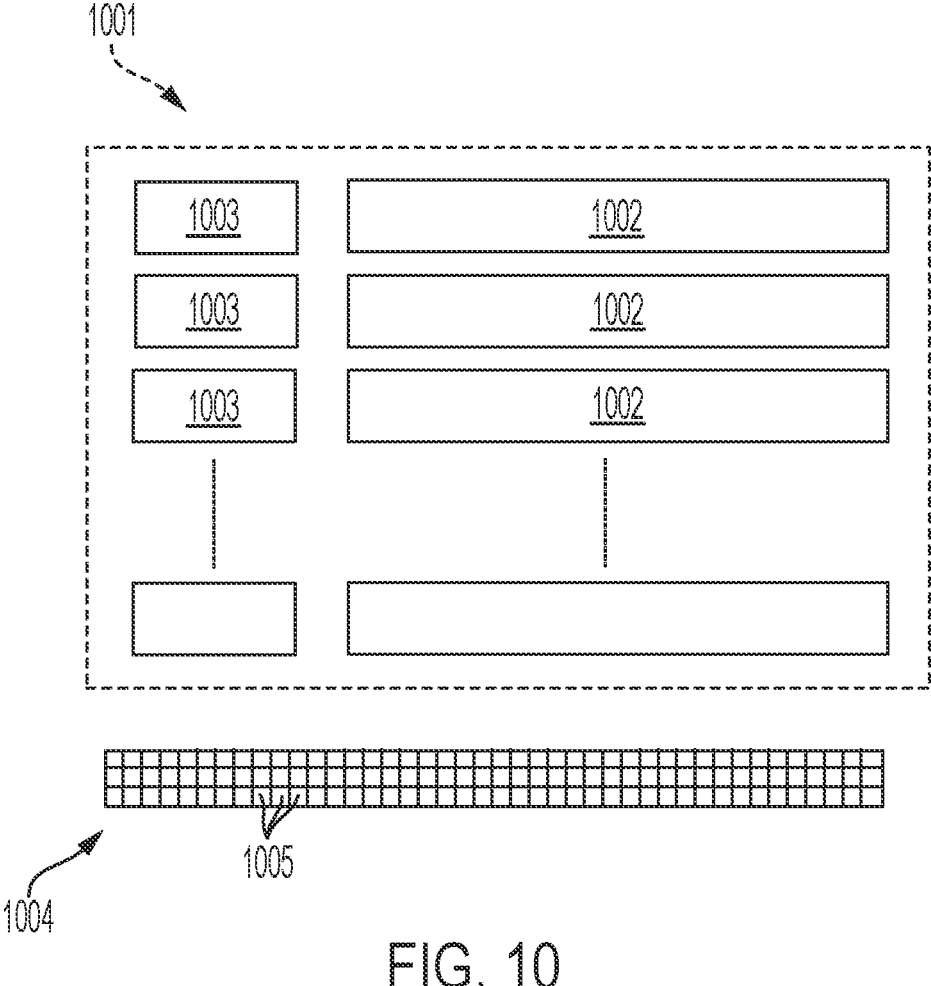
FIG. 10 is a schematic diagram of a cache and data structures associated with the computer-implemented method of FIGS. 9A, 9B and 9C in accordance with one or more embodiments of the present invention.

With reference to FIG. 10, in an exemplary case in which the computer-implemented method 900 of FIG. 9A is executed, a cache 1001 can include multiple tracks 1002 as well as multiple cache control blocks 1003 that respectively manage operations for corresponding ones of the tracks 1002. A separate memory structure 1004 can include a bitmap 1005 for each of the cache control blocks 1003. When an operation is commanded to read data from any of the tracks 1002 that have been recently modified, each bitmap 1005 is reviewed to identify any bitmap 1005 whose modified bit 224 is set. This will identify the cache control blocks 1003 for only those tracks from which data is to be read according to the command and thus saves time that would otherwise be spent scanning the entirety of the cache for the recently modified tracks 1002. Following an execution of the read, any bitmap 1005 whose modified bit 224 was set can be maintained or reset.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
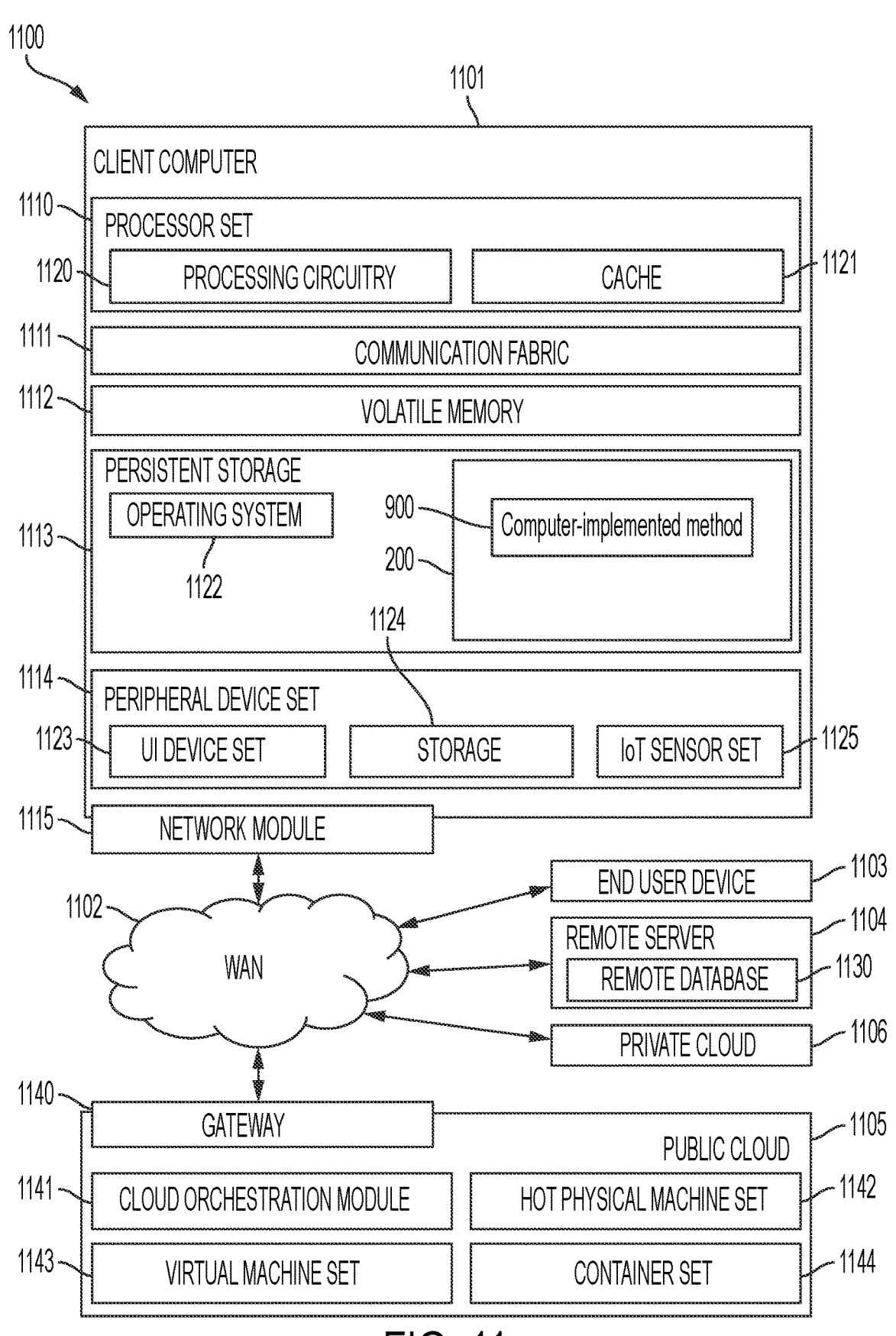
FIG. 11 is a schematic diagram of a computing environment for executing the computer-implemented method of FIGS. 9A, 9B and 9C in accordance with one or more embodiments of the present invention.

With reference to FIG. 11, a computer or computing device 1100 that implements the computer-implemented method 900 of FIG. 9A in accordance with one or more embodiments of the present invention is provided. The computer or computing device 1100 of FIG. 11 contains an example of an environment for the execution of at least some of the computer code involved in performing the inventive methods, such as the block 200 of the computer-implemented method 900 of FIG. 9A for processing data connection requests. In addition to the computer-implemented method 900 of block 200, the computer or computing device 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and the computer-implemented method 900 of block 200, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

The computer 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of the computer-implemented method 900, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

The processor set 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In the computer-implemented method 900, at least some of the instructions for performing the inventive methods may be stored in the block 200 of the computer-implemented method 900 in persistent storage 1113.

Communication fabric 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

Persistent storage 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in the block 200 of the computer-implemented method 900 typically includes at least some of the computer code involved in performing the inventive methods.

Peripheral device set 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

Network module 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

Remote server 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

Public cloud 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for managing tracks in a cache, the computer-implemented method comprising:
instantiating cache control blocks, each one of the cache control blocks being disposed to respectively manage operations for a corresponding one of the tracks; and
instantiating a bitmap corresponding to each of the cache control blocks, each bitmap comprising:
an active bit indicating whether the corresponding one of the tracks for which the corresponding cache control block manages operations is active; and
additional bits indicating additional characteristics of the corresponding one of the tracks for which the corresponding cache control block manages operations,
wherein, once a state of the corresponding one of the tracks changes and the corresponding bitmap requires updating, the computer-implemented method further comprises:
setting a bit as a pinned bit in an event the corresponding one of the tracks is pinned; and
resetting the bit in an event the corresponding one of the tracks is one of unpinned, modified, to be transferred or to be restored,
wherein the computer-implemented method further comprises:
determining whether the bitmap is usable by a cache scan once the cache scan is initiated;
scanning an entirety of the cache in an event the bitmap is determined to not be usable by the cache scan; and
dividing the bitmap into chunks in an event the bitmap is determined to be usable by the cache scan and starting tasks to process the chunks one at a time with each task picking a next chunk to process and comparing each bit in the next chunk to scan criterion.

2. The computer-implemented method according to claim 1, wherein:

the additional bits for each bitmap comprise at least one or more of the pinned bit, a modified bit, a metadata bit, a transfer bit and a restore bit.

3. The computer-implemented method according to claim 1, wherein:
the instantiating of the cache control blocks comprises instantiating the cache control blocks in a free state; and
the computer-implemented method further comprises assigning each one of the cache control blocks to the corresponding one of the tracks in response to an operation relative to the one of the tracks being commanded.

4. The computer-implemented method according to claim 1, further comprising setting the active bit and corresponding ones of the additional bits in each bitmap following completion of an operation of the cache control block relative to the corresponding one of the tracks.

5. The computer-implemented method according to claim 1, further comprising:
receiving a command to execute an operation relative to at least a portion of the tracks having a characteristic associated with the operation;
scanning each bitmap to identify, from the active bit and the additional bits in each bitmap, each cache control block that manages the operations of the corresponding one of the tracks and that has the characteristic; and
executing the operation via each cache control block that manages the operations of the corresponding one of the tracks and that has the characteristic.

6. The computer-implemented method according to claim 5, further comprising re-setting the active bit and corresponding ones of the additional bits in each bitmap corresponding to each cache control block that manages the operations of the corresponding one of the tracks and that has the characteristic following completion of the operation.

7. The computer-implemented method according to claim 1, further comprising:
disassociating each one of the cache control blocks from each corresponding one of the tracks; and
clearing the active bit and the additional bits in each bitmap corresponding to each one of the cache control blocks.

8. A computer program product for managing tracks in a cache, the computer program product comprising one or more computer readable storage media having computer readable program code collectively stored on the one or more computer readable storage media, the computer readable program code being executed by a processor of a computer system to cause the computer system to perform a method comprising:
instantiating cache control blocks, each one of the cache control blocks being disposed to respectively manage operations for a corresponding one of the tracks; and
instantiating a bitmap corresponding to each of the cache control blocks, each bitmap comprising:
an active bit indicating whether the corresponding one of the tracks for which the corresponding cache control block manages operations is active; and
additional bits indicating additional characteristics of the corresponding one of the tracks for which the corresponding cache control block manages operations,
wherein, once a state of the corresponding one of the tracks changes and the corresponding bitmap requires updating, the method further comprises:
setting a bit as a pinned bit in an event the corresponding one of the tracks is pinned; and resetting the bit in an event the corresponding one of the tracks is one of unpinned, modified, to be transferred or to be restored, wherein the method further comprises:

determining whether the bitmap is usable by a cache scan once the cache scan is initiated;

scanning an entirety of the cache in an event the bitmap is determined to not be usable by the cache scan; and dividing the bitmap into chunks in an event the bitmap is determined to be usable by the cache scan and starting tasks to process the chunks one at a time with each task picking a next chunk to process and comparing each bit in the next chunk to scan criterion.

9. The computer program product according to claim 8, wherein:

the additional bits for each bitmap comprise at least one or more of the pinned bit, a modified bit, a metadata bit, a transfer bit and a restore bit.

10. The computer program product according to claim 8, wherein:

the instantiating of the cache control blocks comprises instantiating the cache control blocks in a free state; and the method further comprises assigning each one of the cache control blocks to the corresponding one of the tracks in response to an operation relative to the one of the tracks being commanded.

11. The computer program product according to claim 8, wherein the method further comprises setting the active bit and corresponding ones of the additional bits in each bitmap following completion of an operation of the cache control block relative to the corresponding one of the tracks.

12. The computer program product according to claim 8, wherein the method further comprises:

receiving a command to execute an operation relative to at least a portion of the tracks having a characteristic associated with the operation;

scanning each bitmap to identify, from the active bit and the additional bits in each bitmap, each cache control block that manages the operations of the corresponding one of the tracks and that has the characteristic; and executing the operation via each cache control block that manages the operations of the corresponding one of the tracks and that has the characteristic.

13. The computer program product according to claim 12, wherein the method further comprises re-setting the active bit and corresponding ones of the additional bits in each bitmap corresponding to each cache control block that manages the operations of the corresponding one of the tracks and that has the characteristic following completion of the operation.

14. The computer program product according to claim 8, further comprising:

disassociating each one of the cache control blocks from each corresponding one of the tracks; and clearing the active bit and the additional bits in each bitmap corresponding to each one of the cache control blocks.

15. A computing system comprising:

a processor;

a memory coupled to the processor; and one or more computer readable storage media coupled to the processor, the one or more computer readable storage media collectively containing instructions that are executed by the processor via the memory to implement a method comprising:

instantiating cache control blocks, each one of the cache control blocks being disposed to respectively manage operations for a corresponding one of the tracks; and instantiating a bitmap corresponding to each of the cache control blocks, each bitmap comprising:

an active bit indicating whether the corresponding one of the tracks for which the corresponding cache control block manages operations is active; and additional bits indicating additional characteristics of the corresponding one of the tracks for which the corresponding cache control block manages operations, wherein, once a state of the corresponding one of the tracks changes and the corresponding bitmap requires updating, the method further comprises:

setting a bit as a pinned bit in an event the corresponding one of the tracks is pinned; and resetting the bit in an event the corresponding one of the tracks is one of unpinned, modified, to be transferred or to be restored, wherein the method further comprises:

determining whether the bitmap is usable by a cache scan once the cache scan is initiated;

scanning an entirety of the cache in an event the bitmap is determined to not be usable by the cache scan; and dividing the bitmap into chunks in an event the bitmap is determined to be usable by the cache scan and starting tasks to process the chunks one at a time with each task picking a next chunk to process and comparing each bit in the next chunk to scan criterion.

16. The computing system according to claim 15, wherein:

the additional bits for each bitmap comprise at least one or more of the pinned bit, a modified bit, a metadata bit, a transfer bit and a restore bit.

17. The computing system according to claim 15, wherein:

the instantiating of the cache control blocks comprises instantiating the cache control blocks in a free state; and the method further comprises assigning each one of the cache control blocks to the corresponding one of the tracks in response to an operation relative to the one of the tracks being commanded.

18. The computing system according to claim 15, wherein the method further comprises setting the active bit and corresponding ones of the additional bits in each bitmap following completion of an operation of the cache control block relative to the corresponding one of the tracks.

19. The computing system according to claim 15, wherein the method further comprises:

receiving a command to execute an operation relative to at least a portion of the tracks having a characteristic associated with the operation;

scanning each bitmap to identify, from the active bit and the additional bits in each bitmap, each cache control block that manages the operations of the corresponding one of the tracks and that has the characteristic; and executing the operation via each cache control block that manages the operations of the corresponding one of the tracks and that has the characteristic, wherein the method further comprises re-setting the active bit and corresponding ones of the additional bits in each bitmap corresponding to each cache control block that manages the operations of the corresponding one of the tracks and that has the characteristic following completion of the operation.

20. The computing system according to claim 15, wherein the method further comprises:

disassociating each one of the cache control blocks from each corresponding one of the tracks; and clearing the active bit and the additional bits in each bitmap corresponding to each one of the cache control blocks.

\* \* \* \* \*

22